United States Patent [19]
Philofsky et al.

[11] 3,823,334
[45] July 9, 1974

[54] ELECTRICAL APPARATUS WITH HIGH VOLTAGE ELECTRICAL CONDUCTOR INSULATED BY MATERIAL INCLUDING HIGH DIELECTRIC CONSTANT INSERTS

[75] Inventors: Harold M. Philofsky, Pittsburgh, Pa.; Pravin A. Sanghavi, Bombay, India

[73] Assignee: Westinghouse Electric Corporation, Pittsburgh, Pa.

[22] Filed: July 18, 1973

[21] Appl. No.: 380,330

[52] U.S. Cl............... 310/196, 174/73 R, 174/127
[51] Int. Cl. ............................................. H02k 3/40
[58] Field of Search .......... 174/73 R, 73 SC, 120 R, 174/127, 142, 143; 310/196

[56] References Cited
UNITED STATES PATENTS

| | | | |
|---|---|---|---|
| 2,939,976 | 6/1960 | Manni | 310/196 |
| 3,160,703 | 12/1964 | Muller | 174/127 X |
| 3,265,998 | 8/1966 | Park | 174/127 X |
| 3,287,489 | 11/1966 | Hvizd, Jr. | 174/120 R X |
| 3,585,274 | 6/1971 | Tomaszewski et al. | 174/73 R |

*Primary Examiner*—Laramie E. Askin
*Attorney, Agent, or Firm*—G. F. Tefler

[57] ABSTRACT

A high voltage, insulated conductor for electrical equipment such as dynamoelectric machines where non-uniform electric stresses occur. The insulation has inserts of a material of high dielectric constant incorporated in the insulation in regions of maximum stress to change the stress distribution in a manner to reduce the maximum stress.

5 Claims, 7 Drawing Figures

PATENTED JUL 9 1974

HIGH DIELECTRIC CONSTANT
MATERIAL, e.g. EPOXY RESIN
CONTAINING BARIUM TITANATE.

ELECTRICAL APPARATUS WITH HIGH VOLTAGE ELECTRICAL CONDUCTOR INSULATED BY MATERIAL INCLUDING HIGH DIELECTRIC CONSTANT INSERTS

BACKGROUND OF THE INVENTION

The present invention relates to high voltage, insulated electrical conductors for use in electrical equipment such as dynamoelectric machines where non-uniform electric stresses occur.

The performance and limitations of an electrical insulation system such as is used on high voltage conductors are determined by the maximum electric stresses to which the insulation is subjected in service, since these stresses determine the regions where electrical breakdown may be initiated or where corona may occur on the insulation surface. In usual practice, the average electric stress, or the average dielectric strength value, is used as a basic insulation design parameter although in most cases the average stress is much lower than the maximum stress which may be present in the insulation system, so that it is necessary to use large safety factors which results in most of the insulation system being utilized far below its capabilities. Reduction of the electric stresses at regions of high field concentration would therefore result in using the whole insulation system closer to its full capabilities by bringing the maximum stress closer to the average stress, thus leading to an upgrading of the insulation and lessening the severity of any corona that might occur.

This problem of designing high voltage insulation systems for use where non-uniform stresses occur is present to some degree in all electrical equipment and, in particular, in dynamoelectric machines such as large generators. The maximum stresses may occur in various regions of such a machine, depending on the geometry of the machine, and may cause corona during operation. This is a particular problem on the coil surfaces at the ends of the stator slots where regions of high electric stresses occur at the corners, and special means are usually provided to eliminate or reduce these excessive stresses at operating voltages.

One widely used method is to provide a high resistance coating on the insulation surface of the coil coming from the stator slot. A conducting coating is normally provided on such coils within the slot, to prevent corona between the coil surface and the slot wall, and a high resistivity paint is coated onto the insulation surface beyond the end of the slot and tied at one end to the conducting coating. The high resistance coating must have the correct resistance to prevent excessive heating at the junction with the conducting film but the resistance must be sufficient to grade the stress along the length of the coating from the high voltage at one end to ground at the junction with the conducting coating. This grading must be such that the electric stress along the insulation surface is below the stress at which corona will occur. This method has been quite successful for the operating voltages now used in large generators although as the voltage increases it becomes more difficult to apply this means for reducing stresses. At still higher voltages, such as the test voltages now in use, this method is not very effective in reducing corona.

Another method which has been used for suppressing corona on the coils of high voltage generators is shown in a patent to Manni, No. 2,939,976. In this system, thin metallic foils are embedded at different depths within the coil insulation outside the slot portion of the coil. The foils are placed so as to form a series-parallel capacitive network within the insulation and in this way the field is controlled so that the maximum electric stresses are reduced. In this system, it is necessary to be sure that the foils are completely outside the slot because of the excessive eddy current heating which would occur in the foils. High field concentrations can occur at the thin edges of the foils and precautions must be taken to prevent any defects in the insulation between the foils or adjacent the edges of the foils since the effects of such defects are magnified. This construction, however, permits stress grading at higher operating voltages than the resistance coating method because it grades the maximum stresses within the insulation as well as at the surface.

SUMMARY OF THE INVENTION

The present invention provides an improved arrangement for reducing the maximum electric stress by capacitive stress grading within a high voltage insulation system. The arrangement is analogous to the metallic foil system described above in that a series-parallel capacitive network is provided within the insulation for grading the stress. In accordance with the present invention, however, this is done in a much more effective manner and without the disadvantages of the previous system by incorporating inserts of material of high dielectric constant into the insulation at regions of high electric stress. These inserts result in forming a capacitive network which has the effect of grading the stress within the insulation and thus greatly reduces the maximum stress in the insulation system.

The preferred material for use in making the inserts is barium titanate which is preferably utilized in powdered form incorporated as a filler in a resin binder which is compatible with the resin bond used in the body of the insulation. Dielectric constants in the range of 40 to 65 can be obtained in this way, compared to a dielectric constant of 4 for the rest of the insulation body. Preferably, the high dielectric constant material is produced in the form of flat, thin sheets which can be cut into appropriate widths and applied during the manufacture of the normal coil insulation which is usually mica tape. The sheets of high dielectric constant material are substituted for the mica tape in predetermined locations in the insulation where maximum stresses occur and the insulation of the coil is then completed in the usual manner. This results in a coil or insulated conductor with built-in stress grading means which very greatly reduce the maximum electric stress.

BRIEF DESCRIPTION OF THE DRAWINGS

The invention will be more fully understood from the following detailed description, taken in connection with the accompanying drawings, in which.

DESCRIPTION OF THE PREFERRED EMBODIMENTS

Figure 1:
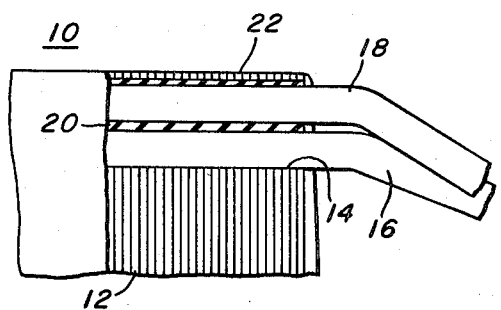
FIG. 1 is a fragmentary view, partly in section, of a portion of a dynamoelectric machine illustrating one application of the invention.

There is shown in FIG. 1, for the purpose of illustration, a portion of a dynamoelectric machine such as a large, high voltage generator in which the insulated coils of the present invention may be used. As shown in FIG. 1, the machine 10 has a laminated core 12 with longitudinal slots 14 therein. Insulated conductors 16 and 18 are disposed in these slots and have end portions extending beyond the slots as shown. The end portions may be curved in the usual manner and extend circumferentially around the machine for connection to coils lying in other slots. The coils 16 and 18 are insulated with high voltage insulation which usually takes the form of resin-bonded mica tape impregnated with a suitable resin and cured. The coils may be separated by insulating spacers 20 and are retained in the slots by wedges generally indicated at 22. It will be seen that very high electric stresses may occur in the regions where the coils 16 and 18 leave the slots, and it has been attempted heretofore to reduce the maximum stresses in this region by such means as the high resistance coating or the embedded metallic foils described above. As previously indicated, however, both of these methods have limitations and disadvantages especially at the higher voltages.

Other locations and configurations of insulated windings also exist in which similar nonuniformities of stress may be found and the invention is, of course, applicable to any such locations. One simple example of another such configuration is that of a high voltage test bar in which the insulation is subjected to an electric field between the metal bar itself and a metal electrode placed on the outside surface of the insulation. For simplicity, the invention is illustrated as applied to such an insulated test bar, although it will be apparent that it is applicable to any type of insulated conductor intended for use in any location of non-uniform electric stress.

Figure 2:
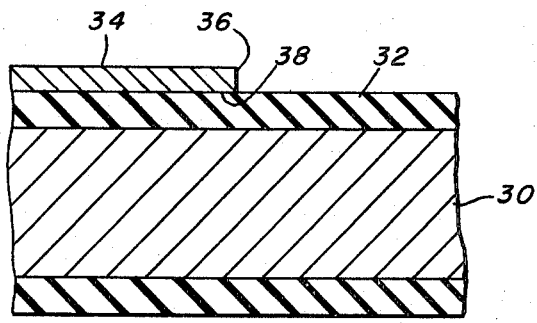
FIG. 2 is a somewhat diagrammatic longitudinal sectional view illustrating an insulated conductor to which the invention is applicable.

FIG. 2 shows an insulated high voltage conductor comprising a central conductor bar 30 which may be copper or any other desired conductor enclosed in a covering of insulation 32. As indicated above, the insulation 32 may comprise the necessary number of layers of mica tape, the thickness of the insulation being exaggerated in the drawing for clarity, although any other desired type of high voltage insulation may be used. In the illustrative embodiment shown, a metallic electrode 34, which may be heavy copper foil, is applied to the outside surface of the insulation 32 to apply a voltage stress across the insulation for test purposes. It will be seen that when a voltage is thus applied between the electrode 34 and the conductor 30, the stress around the ends of the foil 34 will be nonuniform and maximum concentrations of electric stress will occur in the air and in the insulation in the regions generally designated 36 and 38, respectively.

Figure 3:
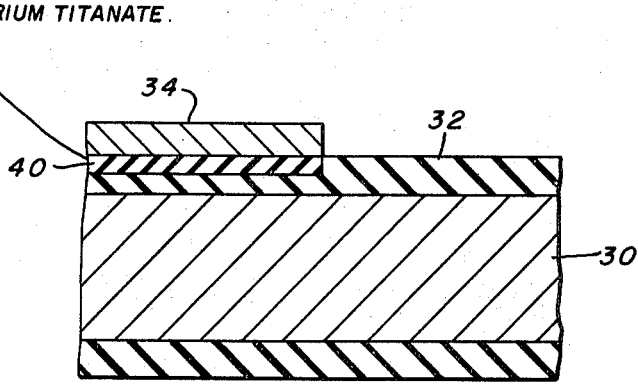
FIG. 3 is a view similar to FIG. 2 showing a preferred embodiment of the invention.

In accordance with the present invention the maximum stress in these regions is reduced in the manner shown in FIG. 3. As there shown, an insert 40 is incorporated in the insulation 32 and is preferably located immediately under the electrode 34 and extending to the edge of the electrode. The insert 40 is made of a material of high dielectric constant as compared to the dielectric constant of the main body of insulation 32, and the effect of this is to build into the insulation a capacitive grading network which materially reduces the maximum electric stress.

The preferred material for the insert 40 is barium titanate ($BaTiO_3$) which is an inorganic crystalline material with a very high dielectric constant. This material is preferably used in the form of a relatively fine powder in a resin binder. The resin must be highly loaded with the powder to obtain a material with a sufficiently high dielectric constant. Various resins are suitable for this purpose, and any resin may be used which is compatible with the resin used in the insulation 32 and which can be fabricated into sheets as described below. Both polyester and epoxy resins have been tried with satisfactory results, but the preferred resin has been found to be an epoxy novolac resin available as Dow DEN438. A loading of the powdered barium titanate filler of about 70 percent to 81 percent by weight in this resin has been found to be very satisfactory and results in a material with a dielectric constant in the range from about 40 to 60.

The components of this material are preferably mixed hot at a temperature of 80°C to 100°C because of the low resin viscosity needed, and the powder is preferably preheated at about 100°C to drive off moisture. Mixing in the amounts previously indicated is then easily accomplished even at the highest filler content, and on cooling to room temperature the filled resin is a milky white material with the consistency of modeling clay and is pliable and moldable. The material may then be cold-pressed into thin sheets between plastic films, and the sheets can be trimmed to the appropriate size for application as a tape or wrapper in the insulation. The resulting material is very flexible and is easily conformable to any shape. Curing of the sheets after application may be done at temperatures from 100°C to 130°C at times varying from 4 to 10 or 12 hours depending upon the temperature. The cured sheets are gray and ceramic-like in appearance and are reasonably tough.

The effectiveness of the inserts of the present invention in high voltage insulation can be seen in the diagrams of FIGS. 4–7. These diagrams are computer plots of the calculated electric field for various configurations of the insulation. In all cases, the diagrams represent conventional high voltage mica tape insulation of a thickness of 0.160 inch with an applied voltage of 100 volts across the insulation 32 between the conductor 30 and the electrode 34. The positions of maximum electric stress with this arrangement were found to be in the air at a distance of 0.0005 inch from the edge of the foil, corresponding to the region 36 of FIG. 2, and in the insulation below the foil at a distance of 0.0005 inch in from the edge of the foil, corresponding to the region 38 of FIG. 2. The dielectric constant of the insulation 32 was 4.0 and of the high dielectric constant inserts was 40.0.

Figure 4:
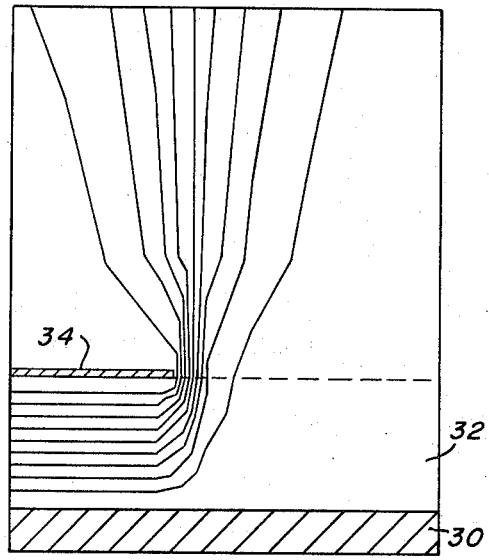
FIGS. 4–7 are diagrams showing electric field distributions for various constructions of insulated conductors.

With these conditions, FIG. 4 represents the electric field distribution with the conductor 30 at a potential of 100 volts and with the electrode 34 grounded, that is, at zero potential. The potential lines shown in this and the following figures were calculated to be at intervals of 10 volts so that they represent percentages of the total voltage. It can be seen from FIG. 4 that in the conventional construction, with no inserts in the insulation, the field is uniform within the insulation at the left side of the figure at about 620 volts per inch, which is the average electric stress on the insulation. At the points of maximum stress referred to above, however, it will be seen that the stresses are extremely high, being approximately 6,679 volts per inch in the air, and about 5,620 volts per inch in the insulation. It is this high maximum electric stress, as compared to the average stress, that the present invention is intended to reduce.

Figure 5:
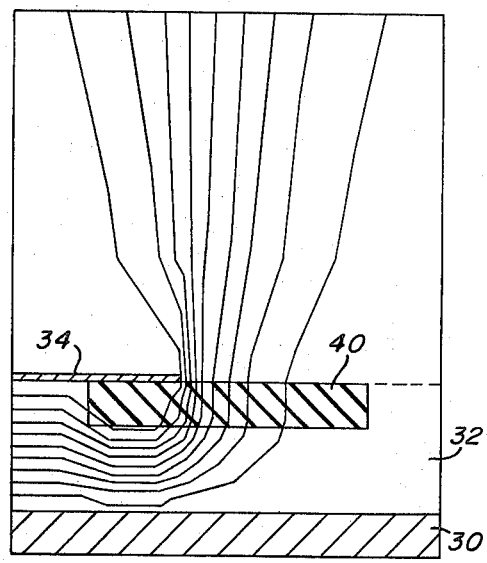
Figure 6:
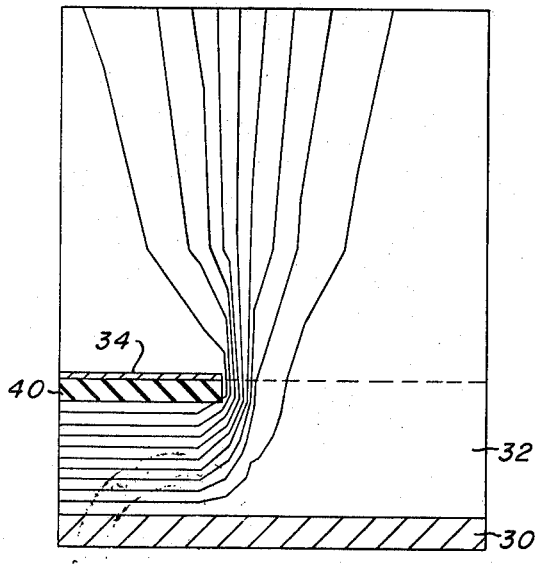
Figure 7:
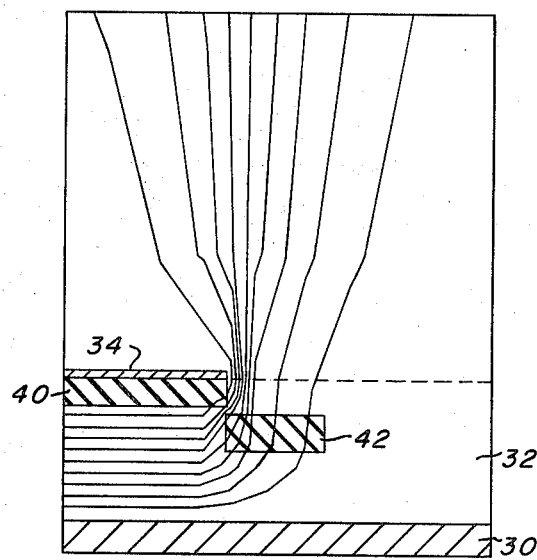

FIG. 5 shows the field distribution for a configuration in which the high dielectric constant insert 40 is placed in the surface of the insulation extending partly under the electrode 34 and partly beyond the electrode. It will be seen that the electric field has been somewhat spread out but the maximum stress is reduced by only about 30%. In FIG. 6, the insert 40 is placed directly beneath the electrode 34 with their edges coinciding, and a much greater reduction in the maximum stress is obtained. FIG. 7 shows still another configuration like that of FIG. 6 but with an additional insert 42 placed in the insulation at a greater depth and beyond the electrode 34. The reduction in maximum stress thus obtained is substantial although less than that obtained with the configuration of FIG. 6.

The voltage stresses obtained in these four configurations are tabulated in the following table which shows that the average stress is the same in all cases but that the maximum stress is very high for the case of FIG. 4 using only the conventional insulation. For the other configurations shown, with high dielectric constant inserts, the maximum stress is substantially reduced and, in particular, in the arrangement of FIG. 6, the maximum stress in the insulation is reduced to very little more than the average stress, which is the desired result. FIG. 6, therefore, shows the preferred embodiment of the invention for this particular illustrative conductor and insulation arrangement.

TABLE

| Configuration | Electric Stress (volts/inch) | | |
|---|---|---|---|
| | Average | Maximum In Air | In Insulation |
| FIG. 4 | 620 | 6679 | 5620 |
| FIG. 5 | 620 | 4716 | 3734 |
| FIG. 6 | 620 | 1270 | 872 |
| FIG. 7 | 620 | 1760 | 1697 |

The manner of applying the present invention to any desired configuration or location of insulated high voltage conductor, such as that of FIG. 1, should now be apparent. The regions of maximum electric stress in or adjacent to the insulation must first be located. This can be done by calculation and by plotting diagrams such as those of FIGS. 4–7, or by observation or in any other desired manner. The effect of different locations and arrangement of the inserts of high dielectric constant material can then be similarly determined and the inserts are placed as required as the insulation is wound onto the coil.

This may be illustrated with reference to the arrangement of FIG. 6 utilizing 0.160 inch thick insulation with the insert 40 placed immediately below the external electrode, and in this case the thickness of the insert is approximately 0.027 inch. As shown in FIG. 6, this results in a very substantial reduction in the maximum electric stress. In manufacturing such a conductor, the usual procedure would, in general, be followed. Insulation of the stated thickness requires approximately twelve half-lapped layers of mica tape. Eleven layers of tape would be wound on the conductor 30 in the usual manner. The twelfth layer would be started and then stopped at the area where the insert 40 is to be placed. A sheet of the required width of the barium titanate filled resin material described above is then wrapped on the conductor in this region, replacing the twelfth layer of mica tape in this location. The twelfth layer of mica tape would then be resumed on the other side of the insert and continued to the end of the conductor. The usual outside glass cloth or other wrapper is then applied, and the coil is processed in the conventional manner by preheating, impregnating with a suitable resin, pressing to final shape and size and curing. During these steps, the built-in insert becomes essentially an integral part of the insulation, as the various resins are chosen to be compatible and bond together in the curing process. In this way, the inserts can be incorporated in any part of the insulation, whether on the surface or within the body of the insulation, in any desired or necessary arrangement.

It should now be apparent that a high voltage insulated electrical conductor has been provided in which the maximum electric stress in the insulation has been reduced and brought much closer to the average value, so that the insulation system as a whole can be stressed closer to its capability and thus more effectively utilized. This result is obtained by the use of the inserts of high dielectric constant material placed in the insulation in or adjacent to regions where the maximum electric stresses will occur in the intended use of the conductor. These locations are, in general, known for large generators and other high voltage electrical equipment and, in any event, can readily be determined. It will also be understood that although a particular relatively simple conductor configuration has been shown and described for the purpose of illustration, the invention is generally applicable to any configuration or arrangement of insulated conductors and can readily be applied in any such case.

What is claimed is:

1. Electrical apparatus with a high voltage electrical conductor insulated to provide reduced electrical stress and comprising:
    a first conductive member;
    a second conductive member spaced from said first member;
    said first and second members being substantially coextensive for a distance to a location at which said first member ends and said second member extends therefrom;
    insulation on said second member, said insulation comprising a plurality of layers of resin bonded insulating tape of a first dielectric constant and an insert of material of a second dielectric constant, substantially higher than said first dielectric constant, said insert being located proximate said first member where said first and second members coextend and having an edge located substantially at the end of said first member.

2. The subject matter of claim 1 wherein:
    said insert comprises barium titanate powder in a resin binder.

3. The subject matter of claim 1 wherein: said insulating tape comprises mica.

4. The subject matter of claim 1 wherein:
said second dielectric constant is in the range from about 40 to 60.

5. The subject matter of claim 1 wherein:
said first member comprises a dynamoelectric machine core having a slot, said second member comprises a conductor in said slot.

* * * * *